United States Patent Office 3,184,509
Patented May 18, 1965

3,184,509
DERIVATIVES OF CYCLOPROPANE-
CARBOXAMIDE
Richard P. Pioch, Indianapolis, Ind., assignor to Eli Lilly and Company, Indianapolis, Ind., a corporation of Indiana
No Drawing. Filed July 23, 1962, Ser. No. 211,883
5 Claims. (Cl. 260—558)

This invention relates to certain novel derivatives of cyclopropanecarboxamide. More particularly, this invention relates to N-substituted derivatives of 1-aralkylcyclopropanecarboxamides.

The compounds of this invention are represented by the formula:

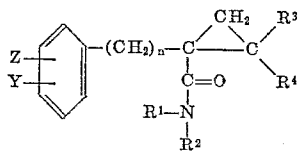

wherein $n=1$ or 2; Y and Z are hydrogen, hydroxy, lower alkyl, containing from one to four carbon atoms, such as methyl, ethyl, isopropyl, butyl, t-butyl, and the like, lower alkoxy containing from one to four carbon atoms, or halogen; $R^3$ and $R^4$ are hydrogen, lower alkyl, or aryl, such as phenyl, halophenyl, naphthyl, and the like; $R^1$ is hydrogen, an aliphatic group containing from one to six carbon atoms, such as methyl, ethyl, allyl, propargyl, dimethylpropargyl, and the like, a cycloaliphatic group containing from three to six carbon atoms, such as cyclopropyl, cyclobutyl, cyclopentyl, and the like, or a hydroxyalkyl group containing from two to six carbon atoms, such as hydroxyethyl, hydroxypropyl, hydroxybutyl, and the like; and $R^2$ is hydrogen or methyl; provided that $R^1$ and $R^2$ cannot both be hydrogen and that when $R^1$ contains two or more carbon atoms $R^2$ must be hydrogen.

The compounds of the present invention are depressants of the central nervous system of the animal organism. Thus, many of the compounds are powerful hypnotic agents. In addition, some of the compounds exhibit muscle relaxant activity.

One general method by which the amides of this invention can be prepared is illustrated by the following reaction scheme:

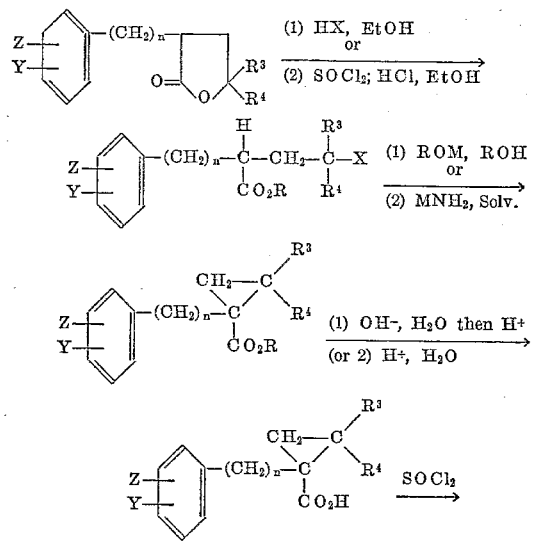

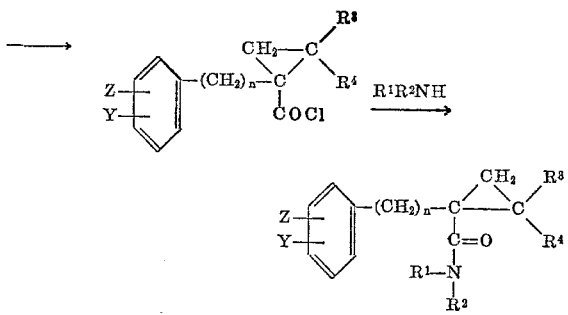

In the above reaction scheme, $n$, Y, Z, $R^1$, $R^2$, $R^3$, and $R^4$ have the meanings previously assigned, X is halogen, R is a lower alkyl group, Solv. is a suitable nonhydroxylic solvent, and M is an alkali metal.

The appropriate substituted lactones required as the starting materials in the outlined synthesis are prepared by methods well known in the art. Thus, for example, an appropriately substituted aldehyde can be condensed with a γ-lactone to produce a 2-aralkylidene lactone which upon reduction yields the desired 2-aralkyl lactone. Another method of preparation employs the reaction of an appropriately substituted malonic ester with an ethylene halide, such as, for example, ethylene bromide, to yield a 2-aralkyl-2-carbalkoxy lactone, which upon subsequent hydrolysis and decarboxylation gives the desired 2-aralkyl lactone. Still another method of preparing the required 2-aralkyl lactone utilizes the reaction of an appropriately substituted malonic ester with ethylene oxide or a substituted ethylene oxide, such as styrene oxide, butadiene monoxide, and the like, and the distillation of the resulting 2-aralkyl-2-carbethoxy lactone with evolution of carbon dioxide and ethylene, to give the desired 2-aralkyl lactone.

The lactone ring can be opened conveniently by allowing the lactone to stand at room temperature with a solution in absolute alcohol of a hydrogen halide, such as hydrogen bromide, hydrogen chloride, and the like, with the resulting formation of a 4-halo ester. The time required to attain maximal yields of the desired halo ester varies somewhat with the nature of the lactone, the particular hydrogen halide employed and the temperature, but in general, it may be stated that from about three to about seven days are adequate to obtain satisfactory yields. The progress of the reaction can be followed by withdrawing samples of the reaction mixture at intervals and determining the approximate amounts of the lactone and halo ester present in the mixture by infrared analysis of the samples. Elevated temperatures are generally to be avoided inasmuch as recyclization to the lactone occurs quite readily. Alternatively, ring opening can be effected by heating the lactone briefly with thionyl chloride, treating the intermediate so formed with a saturated solution of hydrogen chloride in absolute ethanol, and isolating the 4-chloro esters so formed under conditions which minimize recyclization to the lactone.

Cyclization of the 4-halo esters to the corresponding 1-aralkyl-1-carbalkoxycyclopropanes is accomplished readily by employing an alkali-metal alkoxide in an alcohol as the cyclizing agent. For example, potassium t-butoxide in t-butanol, sodium methoxide in methanol, sodium ethoxide in ethanol, and like combinations can be employed. A preferred combination is potassium t-butoxide in t-butanol. Alternatively, the cyclization of the 4-halo ester can be effected by employing an alkali-metal amide, such as sodium amide, potassium amide, or lithium amide, in a suitable nonhydroxylic solvent, such as benzene, toluene, dimethylformamide, and the like. In the situation in which at least one of the groups $R^3$ and $R^4$ is a group other than hydrogen, the configuration about the cyclopropane ring can, of course, exist in either the cis or trans form. In general, one of these forms predominates, although both forms are embraced by the invention, and it is not necessary to separate the two isomers, even though this can be accomplished quite readily when the physical properties of the two isomers differ to a significant extent.

Hydrolysis of the 1-aralkyl-1-carbalkoxycyclopropanes affords the corresponding 1-aralkyl-1-cyclopropanecarboxylic acids in good yields. The hydrolysis can be carried out under either acidic or basic conditions, although generally basic conditions are preferred.

Preparation of the 1-aralkyl-1-cyclopropanecarboxamides is carried out conveniently through the intermediate acid chlorides which can be prepared from the acids by any of the standard methods known in the art, as for example, by reaction of the acids with thionyl chloride, phosphorus pentachloride and the like. The reaction of the acid chloride with the appropriate amine is preferably carried out in an inert solvent, such as benzene, toluene, and the like, at least a twofold excess of the amine being employed. Preliminary purification of the amide is accomplished readily by washing successively with dilute acid to remove excess amine and with dilute base to remove any acid arising by hydrolysis of unreacted acid chloride. In the case of amides substituted on the nitrogen atom by groups having an asymmetric carbon atom, either optical isomer can be obtained by using the appropriate optically active amine.

The substituted cyclopropanecarboxamides of this invention can be administered alone or in combination with a pharmaceutical excipient, such as a solid or liquid diluent, buffer, binder, coating material, preservative, flavoring agent, emulsifier, or the like. The solid dosage forms are especially convenient to administer and may consist of tablets and/or filled capsules comprising the drug and one or more of the commonly used solid diluents, such as talc, lactose, starch, magnesium stearate, methylcellulose, and the like, in such proportion as to furnish a definite dosage unit. The compounds are effective by both oral and parenteral routes of administration.

The following examples are provided to illustrate the invention, although the scope of the invention is not to be construed as limited thereto.

Example 1

*Ethyl 2-(p-chlorobenzyl)-4-bromobutyrate.*—Sixty-five grams of 2-(p-chlorobenzyl)butyrolactone are added to a solution of 100 g. of anhydrous hydrogen bromide in 400 ml. of absolute ethanol. The mixture is allowed to stand at room temperature for seven days, at the end of which time the infrared spectrum of a sample indicates 85–90 percent formation of ethyl 2-(p-chlorobenzyl)-4-bromobutyrate. Excess hydrogen bromide and ethanol are removed from the reaction mixture in vacuo, and the residue is dissolved in ether. The ether solution is washed with water until the washings are neutral, and is then dried over anhydrous magnesium sulfate. Evaporation of the solvent, after removal of the drying agent by filtration, gives crude ethyl 2-(p-chlorobenzyl)-4-bromobutyrate.

*1 - carbethoxy-1-(p-chlorobenzyl)cyclopropane.* — Potassium t-butoxide is prepared by adding 39 g. of potassium metal to 1200 ml. of t-butanol. To this solution there are added with stirring 319 g. of ethyl 2-(p-chlorobenzyl)-4-bromobutyrate, while the temperature is maintained at about 25° C. When the addition of the ester has been completed, the mixture is heated at reflux for about eight hours. The reaction mixture is cooled and washed with 200 ml. of water, and the organic layer is heated in vacuo to remove the solvent. The residue is dissolved in about 500 ml. of ether and is washed with water until the aqueous layer is no longer basic. The ether layer is dried over anhydrous magnesium sulfate and, after filtration to remove the drying agent, is evaporated to give 216 g. of crude product. This is distilled at about 0.5 mm. Hg to give about 180 g. of 1-carbethoxy-1-(p-chlorobenzyl)cyclopropane boiling at about 110–116° C. *Analysis.*—Calc.: C, 65.30; H, 6.30. Found: C, 65.42; H, 6.13.

*1-(p-chlorobenzyl)cyclopropanecarboxylic acid.* — A solution of 40 g. of sodium hydroxide in 50 ml. of water is mixed with 180 g. of 1-carbethoxy-1-(p-chlorobenzyl)cyclopropane, and sufficient ethanol is added to the mixture to make it homogeneous. The solution is allowed to stand at room temperature for about 24 hours. After removal of the solvents in vacuo, the residue is dissolved in water, washed with ether, and acidified, while being cooled in an ice bath, with 10 percent hydrochloric acid solution. The acidic mixture is extracted with ether and the combined ether extracts are washed with water. The ether solution is dried over anhydrous magnesium sulfate and, after filtration, is evaporated to give 140 g. of crystalline 1 - (p - chlorobenzyl)cyclopropanecarboxylic acid. Successive recrystallizations from ethanol and cyclohexane result in a product melting at 126–127° C. *Analysis.*—Calc.: C, 62.95; H, 5.24; Cl, 16.95. Found: C, 62.85; H, 5.23; Cl, 16.26.

*1 - (p-chlorobenzyl)cyclopropanecarbonyl chloride.*—A solution of 154 g. of thionyl chloride, 134 g. of 1-(p-chlorobenzyl)cyclopropanecarboxylic acid and 600 ml. of benzene is heated under reflux for four hours and is then allowed to stand overnight. The excess thionyl chloride and the benzene are removed in vacuo, and the residue is distilled to give 1-(p-chlorobenzyl)cyclopropanecarbonyl chloride boiling at about 95° C. at about 0.05 mm. Hg; $n_D^{25}$ 1.5532. *Analysis.*—Calc.: C, 58.01; H, 5.19; Cl, 28.95. Found: C, 57.70; H, 4.37; Cl, 30.90.

*N-methyl - 1 - (p-chlorobenzyl)cyclopropanecarboxamide.*—To a cooled solution of 2 g. of methylamine in 15 ml. of anhydrous benzene are added 3 g. of 1-(p-chlorobenzyl)cyclopropanecarbonyl chloride. The mixture is allowed to stand at room temperature for about two days, and is then washed successively with water, 5 percent aqueous hydrochloric acid, and 10 percent aqueous sodium bicarbonate. The benzene solution is dried over anhydrous magnesium sulfate and, after filtration to remove the drying agent, is evaporated in vacuo to give the desired N - methyl-1-(p-chlorobenzyl)cyclopropanecarboxamide. The product, after recrystallization from a mixture of benzene and Skelly B, melts at about 49–50° C. *Analysis.*—Calc.: C, 64.43; H, 6.31; N, 6.26. Found: C, 64.62; H, 6.62; N, 6.13.

Example 2

By repeating the procedure described in Example 1, using ethylamine in the final step, N-ethyl-1-(p-chlorobenzyl)cyclopropanecarboxamide is obtained. After recrystallization from a mixture of benzene and Skelly B, the product melts at about 65–66° C. *Analysis.*—Calc.: C, 65.72; H, 6.77; N, 5.88. Found: C, 65.95; H, 6.96; N, 5.86.

Example 3

To a solution of 1.8 g. of cyclopropylamine in 100 ml. of anhydrous benzene are added 2.1 g. of 1-(p-chlorobenzyl)cyclopropanecarbonyl chloride. An oil separates which solidifies upon cooling. The mixture is washed successively with water, 5 percent aqueous hydrochloric acid and 5 percent aqueous sodium bicarbonate, and the benzene layer is dried over anhydrous magnesium sulfate. Filtration to remove the drying agent and evaporation of the solvent in vacuo yields N-cyclopropyl-1-(p-chlorobenzyl)cyclopropanecarboxamide, melting at about 72–73° C., after recrystallization from a mixture of benzene and Skelly B. *Analysis.*—Calc.: C, 67.60; H, 6.08; N, 5.63; Cl, 14.26. Found: C, 67.99; H, 6.43; N, 5.37; Cl, 14.33.

Example 4

By employing the procedure of Example 3 with isopropylamine, N-isopropyl-1-(p-chlorobenzyl)cyclopropanecarboxamide melting at about 88–90° C. is obtained. *Analysis.*—Calc.: C, 67.00; H, 7.22; N, 5.57. Found: C, 66.78; H, 7.22; N, 5.49.

Example 5

When isobutylamine is employed in the final step of the procedure described in Example 1, N-isobutyl-1-(p-chlorobenzyl)cyclopropanecarboxamide is obtained. The product melts at about 61–62° C. after recrystallization from a mixture of benzene and Skelly B. *Analysis.*—Calc.: C, 67.40; H, 7.55; Cl, 13.34. Found: C, 67.54; H, 7.58; Cl, 13.70.

Example 6

By employing sec.-butylamine in the final step of the procedure in Example 1, N-sec.-butyl-1-(p-chlorobenzyl)-cyclopropanecarboxamide melting at about 87–88° C. is obtained. *Analysis.*—Calc.: C, 67.90; H, 7.54, N, 5.28. Found: C, 67.50; H, 7.58; N, 4.97.

Example 7

The use of cyclopentylamine in the procedure of Example 3 yields N-cyclopentyl-1-(p-chlorobenzyl)cyclopropanecarboxamide melting at about 89–90° C. *Analysis.*—Calc.: C, 69.50; H, 6.90; N, 5.06; Cl, 12.70. Found: C, 69.78; H, 7.38; N, 4.78; Cl, 12.74.

Example 8

When the amine employed in the final step of the procedure described in Example 1 is 2-amino-1-propanol, the product obtained is N-(1-hydroxy-2-propyl)-1-(p-chlorobenzyl)cyclopropanecarboxamide. After recrystallization from a mixture of benzene and Skelly B, the compound melts at about 64–65° C. *Analysis.*—Calc.: C, 62.80; H, 6.73; Cl, 13.25. Found: C, 62.94; H, 6.90; Cl, 13.57.

Example 9

The reaction of 1-(p-chlorobenzyl)cyclopropanecarbonyl chloride with 2-amino-1-butanol yields N-(1-hydroxy-2-butyl)-1-(p-chlorobenzyl)cyclopropanecarboxamide as a heavy oil. *Analysis.*—Calc.: C, 63.93; H, 7.15; N, 4.97; Cl, 12.58. Found: C, 64.46; H, 7.43; N, 4.73; Cl, 12.70.

Example 10

The use of 3-amino-3-methyl-1-butyne as the amine in the final step of the procedure of Example 1 yields N-(1,1-dimethyl-propargyl)-1-(p-chlorobenzyl)cyclopropanecarboxamide melting at about 94–95° C. *Analysis.*—Calc.: C, 69.68; H, 6.57; N, 5.08. Found: C, 69.85; H, 6.78; N, 4.86.

Example 11

By employing cyclopropylmethylamine in the final step of Example 1, N-cyclopropylmethyl-1-(p-chlorobenzyl)-cyclopropanecarboxamide melting at about 85–86° C. is obtained. *Analysis.*—Calc.: C, 68.30; H, 6.87; N, 5.31; Cl, 13.44. Found: C, 67.71; H, 6.53; N, 5.36; Cl, 13.84.

Example 12

By following the procedure of Example 1 and employing L(+)-threo-2-amino-3-butanol in the final step, the resulting product is N-(L(+)-2-hydroxy-3-butyl)-1-(p-chlorobenzyl)cyclopropanecarboxamide. *Analysis.*—Calc.: C, 63.93; H, 7.15; N, 4.97; Cl,12.58. Found: C, 64.21; H, 7.33; N, 4.69; Cl, 12.52.

Example 13

*1-cyclopropylethylamine.*—To a stirred mixture of 38 g. of lithium aluminum hydride in one liter of anhydrous ether are added slowly 49.5 g. of cyclopropyl methyl ketoxime. After the addition has been completed, the reaction mixture is heated under reflux for about two hours and is then allowed to stand overnight at room temperature. Decomposition of the complex and excess lithium aluminum hydride is effected by adding, in successive portions, 25 ml. of water, 19 ml. of 20 percent aqueous sodium hydroxide, and 87 ml. of water to the well-cooled reaction mixture. The reaction mixture is filtered and the filtrate is distilled at atmospheric pressure to yield crude 1-cyclopropylethylamine. After drying overnight over flakes of sodium hydroxide, the amine is redistilled, the fraction boiling at about 90–92° C. at atmospheric pressure being collected.

*N-(1-cyclopropylethyl)-1-(p-chlorobenzyl)cyclopropanecarboxamide.*—The reaction of 3 g. of 1-(p-chlorobenzyl)cyclopropanecarbonyl chloride and 2.6 g. of 1-cyclopropylethylamine results in the formation of N-(1-cyclopropylethyl)-1-(p-chlorobenzyl)cyclopropanecarboxamide melting at about 71–72° C. *Analysis.*—Calc.: N, 5.04. Found: N, 5.05.

Example 14

*L-valinol.*—A solution of 50 g. of L-valine in 600 ml. of absolute ethanol is saturated with anhydrous hydrogen chloride and allowed to stand at room temperature for about 40 hours. Excess hydrogen chloride and ethanol are removed in vacuo. The residue is suspended in about one liter of cold ether and about 85 ml. of cold 5 N aqueous sodium hydroxide solution are added. The mixture is shaken quickly, the ether phase is separated, and the aqueous phase is extracted rapidly with ether. The combined ether extracts are dried over anhydrous sodium sulfate and, after filtration, the ether is evaporated to leave a residue of about 60 g. of the ethyl ester of L-valine. This is dissolved in about 375 ml. of anhydrous ether and added with stirring to 26.5 g. of lithium aluminum hydride in about 375 ml. of anhydrous ether. The reaction mixture is heated under reflux for two hours and is then cooled. About 65 ml. of water are added and the mixture is again heated under reflux with stirring for about three hours. After cooling, the ether layer is decanted and the residue is extracted with additional ether. Evaporation of the combined ether extracts leaves a yellow oil which, upon distillation through a short Claisen head, gives L-valinol boiling at about 71.5–73.5° C. at about 5.0 mm. Hg.

*N-(L(+)-1-hydroxy-3-methyl-2-butyl)-1-(p-chlorobenzyl)-cyclopropanecarboxamide.*—The reaction of L-valinol with 1-(p-chlorobenzyl)cyclopropanecarbonyl chloride by the procedure described in Example 1 gives the amide as a thick oil. *Analysis.*—Calc.: C, 64.96; H, 7.49; N, 4.73. Found: C, 65.14; H, 7.70; N, 4.57.

Example 15

The use of dimethylamine in the procedure of Example 3 gives N,N-dimethyl-1-(p-chlorobenzyl)cyclopropanecarboxamide as a heavy oil.

Example 16

*2-carbethoxy-2-(m-chlorobenzyl)butyrolactone.*—To a suspension of 50.5 g. of sodium hydride (55 percent in mineral oil) in one liter of anhydrous benzene are added 328 g. of diethyl m-chlorobenzylmalonate. When the addition is completed, 50 g. of N-methylpyrrolidone are added. After the reaction mixture has become homogeneous, 460 g. of ethylene bromide are added rapidly, and the reaction mixture is heated at reflux temperature for eight hours. The reaction mixture is cooled, the precipitated sodium bromide is removed by filtration, and the solvents are removed in vacuo. The residue is washed with water and extracted with ether. The combined ether extracts are dried over anhydrous magnesium sulfate, and, after filtration to remove the drying agent and evaporation of the ether, the residue is distilled to give 2-carbethoxy-2-(m-chlorobenzyl)butyrolactone.

2-(m-chlorobenzyl)butyrolactone.—To a hot 50 percent aqueous solution of sodium hydroxide containing 48 g. of sodium hydroxide there are added 112 g. of 2-carbethoxy-2-(m-chlorobenzyl)butyrolactone and sufficient ethanol to make the mixture homogeneous. The reaction mixture is heated under reflux for about eight hours and is then allowed to stand overnight. After removal of the solvents in vacuo, the residue is washed four times with 100-ml. portions of ether. The residue, while being cooled in an ice bath, is acidified with 20 percent aqueous hydrochloric acid solution and is then extracted three times with 100-ml. portions of ether. The ether extracts are combined and the ether is evaporated in vacuo. The residue is then heated under reflux with about 200 ml. of concentrated hydrochloric acid for about 18 hours. The hydrochloric acid is removed in vacuo and the residue is dissolved in ether and washed three times with 100-ml. portions of water, three times with 200-ml. portions of aqueous 5 percent sodium bicarbonate solution, and then again with water until the washings are neutral. The organic layer is dried over anhydrous magnesium sulfate, filtered to remove the drying agent, and evaporated to give an oil which upon distillation gives 2-(m-chlorobenzyl)butyrolactone boiling at about 150–156° C. at about 0.1–0.2 mm. Hg. *Analysis.*—Calc.: C, 63.00; H, 5.24; Cl, 16.85. Found: C, 62.69; H, 5.33; Cl, 16.55.

*1-carbethoxy - 1-(m-chlorobenzyl)cyclopropane.*—Ring opening of 2-(m-chlorobenzyl)butyrolactone with hydrogen bromide as described in Example 1 gives ethyl 2-(m-chlorobenzyl)-4-bromobutyrate, which is cyclized directly to 1-carbethoxy-1-(m-chlorobenzyl)cyclopropane boiling at about 97–108° C. at about 0.3 to 0.4 mm. Hg.

*1-(m-chlorobenzyl)cyclopropanecarboxylic acid.*—Hydrolysis of the corresponding ester by a procedure similar to that described in Example 1 gives 1-(m-chlorobenzyl)cyclopropanecarboxylic acid melting at about 64–65° C.

*N-methyl - 1 - (m - chlorobenzyl)cyclopropanecarboxamide.*—Conversion of 1-(m-chlorobenzyl)cyclopropanecarboxylic acid to the acid chloride by reaction with thionyl chloride followed by reaction of the acid chloride with methylamine results in the formation of N-methyl-1-(m-chlorobenzyl)cyclopropanecarboxamide.

*Example 17*

The reaction of cyclopropylamine with 1-(m-chlorobenzyl)cyclopropanecarbonyl chloride, as in Example 16, yields N-cyclopropyl-1-(m-chlorobenzyl)cyclopropanecarboxamide melting at about 66–67° C. *Analysis.*—Calc.: C, 67.33; H, 6.45; N, 5.61. Found: C, 67.55; H, 6.60; N, 5.53.

*Example 18*

N-methyl - 1 - (o-methoxybenzyl)cyclopropanecarboxamide is prepared by the sequence of steps described in Example 1 from 2-(o-methoxybenzyl)butyrolactone. Conversion of the lactone to ethyl 2-(o-methoxybenzyl)-4-bromobutyrate followed by cyclization with potassium t-butoxide yields 1-carbethoxy-2-(o-methoxybenzyl)cyclopropane boiling at about 133–136° C. at about 0.05 mm. Hg. *Analysis.*—Calc.: C, 71.77; H, 7.74. Found: C, 71.50; N, 7.86. Hydrolysis of the ester thus obtained gives 1-(o-methoxybenzyl)cyclopropanecarboxylic acid melting at about 119–120° C. *Analysis.*—Calc.: C, 70.00; H, 6.80. Found: C, 70.61; H, 6.67. From the resulting acid and thionyl chloride 1-(o-methoxybenzyl)cyclopropanecarbonyl chloride boiling at about 110–112° C. at about 0.3 mm. Hg is obtained. *Analysis.*—Calc.: C, 64.30; H, 5.78; Cl, 15.75. Found: C, 64.85; H, 5.80; Cl, 15.70. Reaction of the acid chloride with methylamine yields N-methyl-1-(o-methoxybenzyl)cyclopropanecarboxamide melting at about 77–78° C. after recrystallization from a mixture of benzene and Skelly B. *Analysis.*—Calc.: C, 71.25; H, 7.78; N, 6.40. Found: C, 70.67; H, 7.82; N, 6.38.

*Example 19*

By employing dimethylamine in the final step of the procedure described in Example 18, N,N-dimethyl-1-(o-methoxybenzyl)cyclopropanecarboxamide is obtained as an oil.

*Example 20*

*2-(m-hydroxybenzyl)butyrolactone.*—A solution of 360 g. of m-hydroxybenzaldehyde and 510 g. of γ-butyrolactone in about 4 liters of anhydrous benzene is cooled in an ice bath while 405 g. of sodium methoxide are added at a rate such that the temperature does not exceed 27° C. The mixture is stirred for three additional hours while being cooled in an ice bath, and is then warmed to 50° C. on a steam bath for an hour before being allowed to stand overnight at room temperature. About 420 g. of sulfuric acid as a 10 percent aqueous solution are added, and the mixture is stirred for about one hour. The precipitate is removed by filtration and is washed with water. Recrystallization from methanol affords 2-(m-hydroxybenzylidene)butyrolactone melting at about 193–195° C. Reduction of this compound using a platinum oxide catalyst and an initial hydrogen pressure of 50 p.s.i. gives 2-(m-hydroxybenzyl)butyrolactone.

*Ethyl 2-(m-hydroxybenzyl) - 4 - bromobutyrate.*—This compound is prepared by a procedure analogous to that described in Example 1 for the p-chlorobenzyl analog.

*1 - carbethoxy - 1 - (m-hydroxybenzyl)cyclopropane.*—Cyclization of ethyl 2-(m-hydroxybenzyl)-4-bromobutyrate by the procedure described in Example 1 gives 1-carbethoxy-1-(m-hydroxybenzyl)-cyclopropane boiling at about 139–141° C. at about 0.2 mm. Hg.

*1 - (m - hydroxybenzyl)cyclopropanecarboxylic acid.*—Hydrolysis of the corresponding ethyl ester as described in Example 1 gives 1-(m-hydroxybenzyl)cyclopropanecarboxylic acid melting at about 100–101° C. *Analysis.*—Calc.: C, 68.80; H, 6.28. Found: C, 68.68; H, 6.41.

*N-methyl-1-(m-hydroxybenzyl)cyclopropanecarboxamide.*—A solution of 19.2 g. of 1-(m-hydroxybenzyl)cyclopropanecarboxylic acid in about 60 ml. of acetone and 15 ml. of water is prepared and cooled to 0° C. in an ice bath while a solution of 25.4 g. of triethylamine in 80 ml. of acetone is added with vigorous stirring. To this is added slowly with stirring a solution of 25 g. of ethylchloroformate in 30 ml. of acetone. Stirring is continued for an additional 30 minutes and then the acetone and water are removed in vacuo at 0° C. The residue is stirred with about 100 ml. of benzene while an excess of a solution of methylamine in benzene is added. After standing overnight, the reaction mixture is evaporated to dryness in vacuo and the N-methyl-1-(m-hydroxybenzyl)cyclopropanecarboxamide is purified as in Example 1.

*Example 21*

N-methyl-1-(4-methylbenzyl)cyclopropanecarboxamide is prepared by the sequence of steps described in Example 1 from 2-(4-methylbenzyl)butyrolactone. This is converted to ethyl 2-(4-methylbenzyl)-4-bromobutyrate which is then cyclized to give 1-carbethoxy-1-(4-methylbenzyl)cyclopropane boiling at about 70–75° C. at about 0.3 mm. Hg. Hydrolysis of this ester yields 1-(4-methylbenzyl)cyclopropanecarboxylic acid melting at about 110–111° C. The acid chloride prepared from the acid with thionyl chloride boils at about 86–88° C. at about 0.05 mm. Hg. *Analysis.*—Calc.: C, 69.06; H, 6.28; Cl, 16.99. Found: C, 69.31; H. 6.43; Cl, 16.21. Reaction of the 1-(4-methylbenzyl)cyclopropanecarbonyl chloride with methylamine in benzene yields N-methyl-1-(4-methylbenzyl)cyclopropanecarboxamide.

*Example 22*

*2-benzyl-4,4-dimethylbutyrolactone.*—A solution of sodium ethoxide in ethanol is prepared by dissolving 11.5 g. of sodium in 250 ml. of absolute ethanol. After 125 g.

of diethyl benzylmalonate have been added, the solution is cooled and 36 g. of isobutylene oxide are added rapidly. The reaction mixture is allowed to warm to room temperature and is then heated under reflux for three hours. The mixture is cooled and acidified with 20 percent aqueous sulfuric acid, and the precipitated sodium sulfate is removed by filtration. The filtrate is evaporated in vacuo, the residue is dissolved in ether, and the ether solution is washed with water until the washings are neutral. The ether layer is dried over anhydrous magnesium sulfate, filtered, and distilled with evolution of carbon dioxide and ethylene to give 2-benzyl-4,4-dimethylbutyrolactone.

*Ethyl-2-benzyl-4-chloro-4-methylvalerate.*—A mixture of 50 g. of 2-benzyl-4,4-dimethylbutyrolactone and 71 g. of thionyl chloride is heated under reflux with 60 ml. of anhydrous benzene for about five hours. The reaction mixture is cooled and poured into an ice-cold solution of ethanol which has been saturated with anhydrous hydrogen chloride at 0° C. The reaction mixture is allowed to warm to room temperature while standing overnight, and then the volatile components are removed in vacuo. The residue is dissolved in ether and washed with water. After drying of the ether solution, the solvent is evaporated to give ethyl 2-benzyl-4-chloro-4-methylvalerate.

*1-carbethoxy-1-benzyl-2,2-dimethylcyclopropane.*—Cyclization of ethyl 2-benzyl-4-chloro-4-methylvalerate with potassium t-butoxide as described above yields 1-carbethoxy-1-benzyl-2,2-dimethylcyclopropane boiling at about 185° C. at about 0.3 mm. Hg.

*1-benzyl-2,2-dimethylcyclopropanecarboxylic acid.*—Hydrolysis of the corresponding ethyl ester results in the formation of 1-benzyl-2,2-dimethylcyclopropanecarboxylic acid. *Analysis.*—Calc.: C, 76.50; H, 7.88. Found: C, 76.83; H, 8.13.

*N-methyl-1-benzyl-2,2-dimethylcyclopropanecarboxamide.*—Conversion of 1-benzyl-2,2-dimethylcyclopropanecarboxylic acid to the corresponding acid chloride followed by reaction of the acid chloride with methylamine in benzene yields N-methyl-1-benzyl-2,2-dimethylcyclopropanecarboxamide.

*Example 23*

By following the procedure of Example 22 and using styrene oxide in place of isobutylene oxide in the first step, N-methyl-1-benzyl-2-phenylcyclopropanecarboxamide is obtained. The 2-benzyl-4-phenylbutyrolactone first obtained boils at about 171–180° C. at about 0.4 mm. Hg. *Analysis.*—Calc.: C, 82.00; H, 6.40. Found: C, 81.26; H, 6.49. The ethyl 2-benzyl-4-chloro-4-phenylbutyrate which results from ring opening of the lactone is cyclized to give 1-carbethoxy-1-benzyl-2-phenylcyclopropane which boils at about 156–166° C. at about 0.5 to 0.6 mm. Hg. *Analysis.*—Calc.: C, 81.30; N, 7.14. Found: C, 81.26; H, 7.26. Hydrolysis of this ester provides 1-benzyl-2-phenylcyclopropanecarboxylic acid melting at about 153–154° C., which is converted via its acid chloride to the desired N-methyl-1-benzyl-2-phenylcyclopropanecarboxamide.

*Example 24*

N-cyclopropyl-1-(β-phenethyl)cyclopropanecarboxamide is prepared by the sequence of steps employed in Example 16 starting with diethyl β-phenethylmalonate. This is converted to 2-carbethoxy-2-(β-phenethyl)butyrolactone from which 2-(β-phenethyl)butyrolactone boiling at about 165° C. at about 0.4 mm. Hg is obtained. *Analysis.*—Calc.: C, 75.00; H, 7.28. Found: C, 75.11; H, 7.45. Cleavage of the lactone ring with hydrogen bromide yields ethyl 2-β-phenethyl-4-bromobutyrate which is cyclized to give 1-carbethoxy-1-(β-phenethyl)cyclopropane boiling at about 95–97° C. at about 0.3 mm. Hg. *Analysis.*—Calc.: C, 77.00; H, 8.25. Found: C, 78.23; H, 8.70. Hydrolysis of this ester gives 1-(β-phenethyl)cyclopropanecarboxylic acid melting at about 83–84° C., which upon reaction with thionyl chloride forms 1-(β-phenethyl)cyclopropanecarbonyl chloride boiling at about 103–110° C. at about 0.3 to 0.4 mm. Hg. Reaction of the acid chloride with cyclopropylamine gives the desired N-cyclopropyl-1-(β-phenethyl)cyclopropanecarboxamide melting at about 98° C. after recrystallization from a mixture of benzene and Skelly B. *Analysis.*—Calc.: N, 6.10. Found: N, 5.96.

I claim:
1. A compound of the formula:

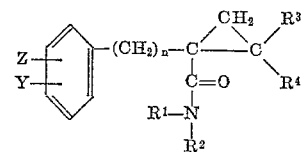

wherein $n$ is an integer selected from the group consisting of 1 and 2; Y is selected from the group consisting of hydrogen, hydroxy, lower alkyl of 1–4 carbon atoms, lower alkoxy of 1–4 carbon atoms, and halogen; Z is selected from the group consisting of hydroxy, lower alkyl of 1–4 carbon atoms, lower alkoxy of 1–4 carbon atoms, and halogen; $R^3$ and $R^4$ are selected from the group consisting of hydrogen, lower alkyl of 1–4 carbon atoms, phenyl, halophenyl, and naphthyl; $R^1$ is selected from the group consisting of hydrogen, alkyl of 1–6 carbon atoms, cycloalkyl of 3–6 carbon atoms, and hydroxyalkyl of 2–6 carbon atoms; and $R^2$ is selected from the group consisting of methyl when $R^1$ is hydrogen, hydrogen and methyl when $R^1$ is methyl, and hydrogen when $R^1$ contains more than one carbon atom.

2. N-cyclopropyl-1-(p-chlorobenzyl)cyclopropanecarboxamide.

3. N-isopropyl-1-(p-chlorobenzyl)cyclopropanecarboxamide.

4. N-(1-hydroxy-2-propyl)-1-(p-chlorobenzyl)cyclopropanecarboxamide.

5. N,N-dimethyl-1-(o-methoxybenzyl)cyclopropanecarboxamide.

References Cited by the Examiner

UNITED STATES PATENTS 2,757,177  7/56  Krapcho et al. _____ 260—558 X

OTHER REFERENCES

Piehl et al.: Jour. Am. Chem. Soc., vol. 75, pages 5023–5 (1953).

IRVING MARCUS, *Primary Examiner.*

NICHOLAS S. RIZZO, WALTER A. MODANCE,
*Examiners.*